United States Patent [19]
Bickerdike et al.

[11] 3,907,950

[45] Sept. 23, 1975

[54] CARBON ARTICLES

[75] Inventors: Robert Lewis Bickerdike; Garyth Hughes, both of Farnham, England

[73] Assignee: Minister of Technology in Her Majesty's Government of the United Kingdom of Great Britain and Northern Ireland, London, England

[22] Filed: Apr. 10, 1972

[21] Appl. No.: 242,785

Related U.S. Application Data

[63] Continuation of Ser. No. 155,227, June 21, 1971, abandoned, which is a continuation of Ser. No. 653,682, July 17, 1967, abandoned.

[30] Foreign Application Priority Data

July 19, 1966 United Kingdom............... 32419/66

[52] U.S. Cl. .................... 264/29; 264/105; 264/123
[51] Int. Cl.² .................... C01B 31/02; C01B 31/04
[58] Field of Search.................. 264/29, 123, 105

[56] References Cited
UNITED STATES PATENTS

| | | |
|---|---|---|
| 3,074,802 | 1/1963 | Alexander et al. ................. 264/123 |
| 3,084,394 | 4/1963 | Bickerdike et al.................... 264/29 |
| 3,092,437 | 6/1963 | Carter et al........................... 264/29 |
| 3,165,480 | 1/1965 | Churchill ............................ 264/105 |
| 3,202,619 | 8/1965 | Le Baron.............................. 264/29 |
| 3,261,892 | 7/1966 | Sommer et al........................ 264/29 |
| 3,310,611 | 3/1967 | Zocher.................................. 264/29 |
| 3,346,678 | 10/1967 | Ohlgren .............................. 264/29 |
| 3,370,113 | 2/1968 | Goeddel............................... 264/29 |

*Primary Examiner*—Robert F. White
*Assistant Examiner*—Thomas P. Pavelko
*Attorney, Agent, or Firm*—Larson, Taylor and Hinds

[57] ABSTRACT

Method of making precisely dimensioned carbon articles is disclosed. A blend of carbon particles and not more than 14% of a polymerizable and carbonizable resin is shaped in a mold under a pressure of at least 800 psi. The shaped article is subsequently carbonized/or graphitized. Pyrolytic carbon may also be deposited into the pores of the shaped article.

20 Claims, No Drawings

CARBON ARTICLES

This is a continuation of application Ser. No. 155,227 filed June 21, 1971, now abandoned; which is a continuation of Ser. No. 653682 filed July 17, 1967, now abandoned.

This invention relates to processes of making and articles made from carbon powder, in particular spark erosion electrodes. The term 'carbon' is to be understood to include graphite.

According to the present invention, a process of making a precisely shaped carbon article comprises the following sequential steps:

a. mixing a carbon powder having a particle size of less than 200 mesh BSS with polymerizable and carbonizable resin binder and an evaporative solvent for the resin and continuing mixing until the solvent has essentially evaporated to obtain a fine powder mixture comprising carbon and not more than 14 percent by weight of the binder;

b. charging a mold with the powder mixture;

c. applying pressure of at least 800 pounds per square inch to the charge and heating the charge in the mold to cure the resin and bond the carbon with cured resin while the charge is held under a pressure of at least 800 psi to form a shaped charge;

d. removing the shaped charge from the mold;

e. heating the removed shaped charge in a non-oxidizing atmosphere at a temperature within the range of from 700°C–1,100°C to carbonize the resin binder; and f. heating the carbonized shaped charge in an atmosphere containing hydrocarbon to deposit carbon pyrolytically into the pores of the carbonized shaped charge.

Preferably the amount of resinous binder is present to the extent of less than 14 per cent by weight of the mixture and the amount in any specific instance will probably be found to be at least partly dependent upon the moulding pressure to be applied.

By restricting the proportions of carbonisable binder resin and by the combined effect of this and consolidation under pressure only small dimensional changes take place during processing and the necessary final strength of the article is obtained by the pyrolytic deposition of arbon which itself gives rises to an almost negligible dimensional change of the article.

The consolidating pressure in general will exceed 10 lb per sq. inch and preferably is within the range of from 40–2,000 lb per sq. inch.

During pyrolysis the carbon-compound gas may be introduced diluted with a carrier gas such as nitrogen.

Non-carbonaceous material such as sand or metal powders may be included with the initial mixture of carbon powder and resin.

It will usually be desirable to process the article made by the process according to the invention in order to reduce the hydrogen content in the article and/or to graphitize non-graphitic carbon in it. This further process will normally be by way of heating the article to a higher temperature than in the carbonisation treatment, for example 1,500°–2,000°C as described in British Patent Specification No. 1,054,197, or in the higher part of the range 1,800°–2,800°C to graphitize the article.

Three examples of carbon articles produced in accordance with the invention are as follows:

EXAMPLE I 182g of graphite powder of particle size less than 200 mesh B.S.S. was mixed with 18g of a novolac resin and 1.8g of hexamine dissolved in 27g of Industrial Methylated Spirits. A mixer employing some grinding as well as a mixing action was used, and the mixing continued until all the solvent had evaporated when the charge was removed as a fine powder suitable for subsequent use. 198g of the resin treated powder was loaded into a split cylindrical metal mould containing a plunger at each end, and was pressed from both ends at 1,000 p.s.i. while heating to a temperature of 150°–180°C to form a compact and at the same time to cure the resin. On reaching the necessary temperature the mould was cooled and the compact, measuring approximately 5.3cm diameter × 5.7cm long, was removed from the metal mould. The compact which had a density of 1.61g/cc. was then slowly heated in a nitrogen atmosphere to approximately 900°C to carbonise the resin bond, and then for a further 15 hours at 830°C under a stream of nitrogen saturated with benzene vapour at 50°C. On removal from the furnace the density of the compact was 1.72g/cc.

EXAMPLE II

A similar compact to that described in example I was prepared which after carbon deposition had a density of 1.70g/cc. This compact was then heated in a carbon tube furnace under a stream of nitrogen to 2,500°C to graphitise the deposited carbon bond and reduce the hydrogen content. After this heat treatment the density of the compact was 1.69g/cc.

EXAMPLE III 250g of Copper powder of particle size less than 200 mesh B.S.S. was mixed with 35g of novolac resin and 3.5g of hexamine dissolved in 38g of Industrial Methylated Spirits. The mixing was continued until the Solvent had evaporated and the resulting powder sieved through a 200 mesh B.S.S. screen. 262g of this resin treated copper was thoroughly mixed with 76g of resin treated graphite powder which was prepared in the manner mentioned in example I giving a mix consisting of approximately equal volumes. The mixture was loaded into the split metal mould mentioned in example I and pressed in the same manner except that the pressure used was only 250 p.s.i. The resulting compact had a density of 2.75g/cc, and after treating in the carbon deposition furnace in exactly the same manner and for the same time as the specimen in example I its density was 3.16g/cc.

The process of the invention is particularly, though not, of course, solely, useful for the production of shaped electrodes for spark erosion machining, where the latter is becoming more and more used for machining to close tolerances, especially metals and profiles which are difficult to machine by orthodox methods. The principle employed in spark erosion techniques is that erosion of metal takes place when a spark crosses between an electrode and a workpiece. Under controlled conditions the electrode can erode its own precise shape and form into the workpiece, this being done whatever the hardness of the material providing it is electrically conductive. Some wear always takes place in the electrode and a good electrode, whilst being cheap and accurate should also have a high cutting rate and a low wear characteristics. Graphite has these desirable physical and electrical properties and because the present process can be used to produce electrode shapes more simply by moulding and still within very close limits of accuracy, the field of application of spark erosion techniques should thereby greatly be enlarged.

For spark erosion electrodes a suitable starting point is an industrial graphite powder of particle size 95% finer than 53 microns, 25% finer than 20 microns. This is mixed typically with 8–10% of phenol/formaldehyde resin and a hardener such as have been described above. This is mixed with the powder in a blade mixer with a slight grinding action until the solvent has evaporated and a liquid-free powder is obtained. It is important to have a fairly uniform resin/graphite mixture, as the resin content has an overriding effect on the dimensional change during firing.

The resin bonded or "green" shape can be made in various ways. We prefer to apply the compacting pressure before the resin has reached its soft stage and to keep it on until the bond has cured. We find it convenient to use a warm metal die and plunger. The powder is fed into the die, the plunger is introduced and the pressure is applied for a long enough period to allow the heat to penetrate the compact and cure it. This may take 30 seconds or more depending on the size of the piece. It is important to have the die at the right temperature, and this is best found by trial and error. The mixture is preferably formed to shape in a warm moulding tool under pressure in the range of 100–1,500 lb. per sq. inch, preferably 800–1,400 lb. per sq. in. It is desirable, in order to ensure the finest surface detail, to use higher pressures and it is possible by this means also to obtain a correct density and bond strength. The resin would appear, first, to become soft and act as a pressing lubricant and then to harden under curing conditions so as to resist the elastic recovery of the powder mould which otherwise takes place when the pressure is released. The remainder of the process will be similar to that described in the above examples.

It is possible also that the process according to the invention may be useful for producing accurate patterns for use, for instance, in the 'shell' moulding presses as well as for other applications, as will be apparent to those skilled in the art.

We claim:

1. In a process of making a carbon article wherein a blend of carbon particles and a polymerizable and carbonizable resin binder is shaped and the shaped material is heated in a nonoxidizing atmosphere to carbonize said resin, the improvement of producing a precisely shaped carbon article wherein the process comprises the following sequential steps:
    a. mixing a carbon powder having a particle size of less than 200 mesh BSS with polymerizable and carbonizable resin binder and an evaporative solvent for the resin and continuing mixing until the solvent has essentially evaporated to obtain a fine powder mixture comprising carbon and not more than 14 percent by weight of said binder;
    b. charging a mold with said powder mixture;
    c. applying pressure of at least 800 pounds per square inch to the charge and heating the charge in the mold to cure the resin and bond the carbon with cured resin while the charge is held under a pressure of at least 800 psi to form a shaped charge;
    d. removing the shaped charge from the mold;
    e. heating the removed shaped charge in a non-oxidizing atmosphere at a temperature within the range of from 700°C – 1,100°C to carbonize the resin binder; and
    f. heating the carbonized shaped charge in an atmosphere containing hydrocarbon to deposit carbon pyrolytically into the pores of the carbonized shaped charge, to produce a high strength, precisely dimensioned, carbon article which, in production, has undergone at most only slight dimensional change after being formed as a shaped charge.

2. A process according to claim 1 wherein said pressure is about 1,000 pounds per square inch.

3. A process according to claim 1 wherein said pressure is from 800 to 2,000 pounds per square inch.

4. A process according to claim 1 wherein said pressure is from 800 to 1,500 pounds per square inch.

5. A process according to claim 1 wherein said pressure is from 800 to 1,400 pounds per square inch.

6. A process according to claim 1 wherein said carbon is crystalline.

7. A process according to claim 4 wherein said crystalline carbon is graphite.

8. A process according to claim 7 and comprising a further step of processing the high strength carbon article by heating it in an inert atmosphere to above the carbonizing temperature to reduce the hydrogen content in the carbon article.

9. A process according to claim 8 and comprising a further step of heating the article in an inert atmosphere at a temperature sufficient to graphitize the pyrolytically deposited carbon.

10. A process according to claim 9 wherein said graphitizing temperature is at least 2,500°C.

11. A process according to claim 1 wherein said resin binder comprises a phenolic resin.

12. A process according to claim 11 wherein said phenolic resin binder comprises a phenol-formaldehyde resin.

13. A process according to claim 1 wherein said evaporative solvent comprises methylated spirits.

14. A process according to claim 1 in which non-carbonaceous refractory material of particle size less than 200 mesh BSS is included with the initial mixture of carbon powder and resin.

15. A process according to claim 1 wherein said mold is a metal mold, and wherein the article produced is a precision shaped article having substantially the same size and shape as that of the shaped charge removed from the mold.

16. A process of making a precision shaped carbon article comprising the steps of:
    a. mixing a carbon powder having a particle size less than 200 mesh BSS with not more than 14 percent by weight of a polymerizable and carbonizable resinous binder and an evaporative solvent and continuing mixing until the carrier has essentially evaporated, to obtain a first powder mixture;
    b. mixing a non-carbonaceous refractory powder having a particle size less than 200 mesh BSS with not more than 14 percent by weight of a polymerizable and carbonizable resinous binder and an evaporative solvent for the resin and continuing mixing until the solvent has essentially evaporated to obtain a second powder mixture;

c. mixing the first and second powder mixtures together to form a compound powder mixture;
d. charging a metal mold with said compound powder mixture;
e. applying pressure of at least 800 pounds per square inch to the charge and heating the charge to substantially cure the resin and bond the charge while held under a pressure of at least 800 psi to form a shaped charge;
f. removing the shaped charge from the mold;
g. heating the removed charge in a non-oxidizing atmosphere at a temperature within the range of from 700°C – 1,00°C to carbonize the resinous bond, and
h. heating the carbonized shaped charge in an atmosphere containing hydrocarbon to deposit carbon pyrolytically into the pores of the carbonized shaped charge, to produce a high strength, precisely dimensioned, carbon article which, in production, has undergone at most only slight dimensional change after being formed as a shaped charge.

17. A process according to claim 16 and including the further step of heating the precision shaped article in an inert atmosphere to above the carbonizing temperature to reduce the hydrogen content in the carbon article.

18. A process according to claim 17 and comprising a further step of heating the article in an inert atmosphere at a temperature sufficient to graphitize the pyrolytically deposited carbon.

19. A method according to claim 16 wherein said carbon is crystalline.

20. A method according to claim 19 wherein said crystalline carbon is graphite.

* * * * *